Patented May 25, 1948

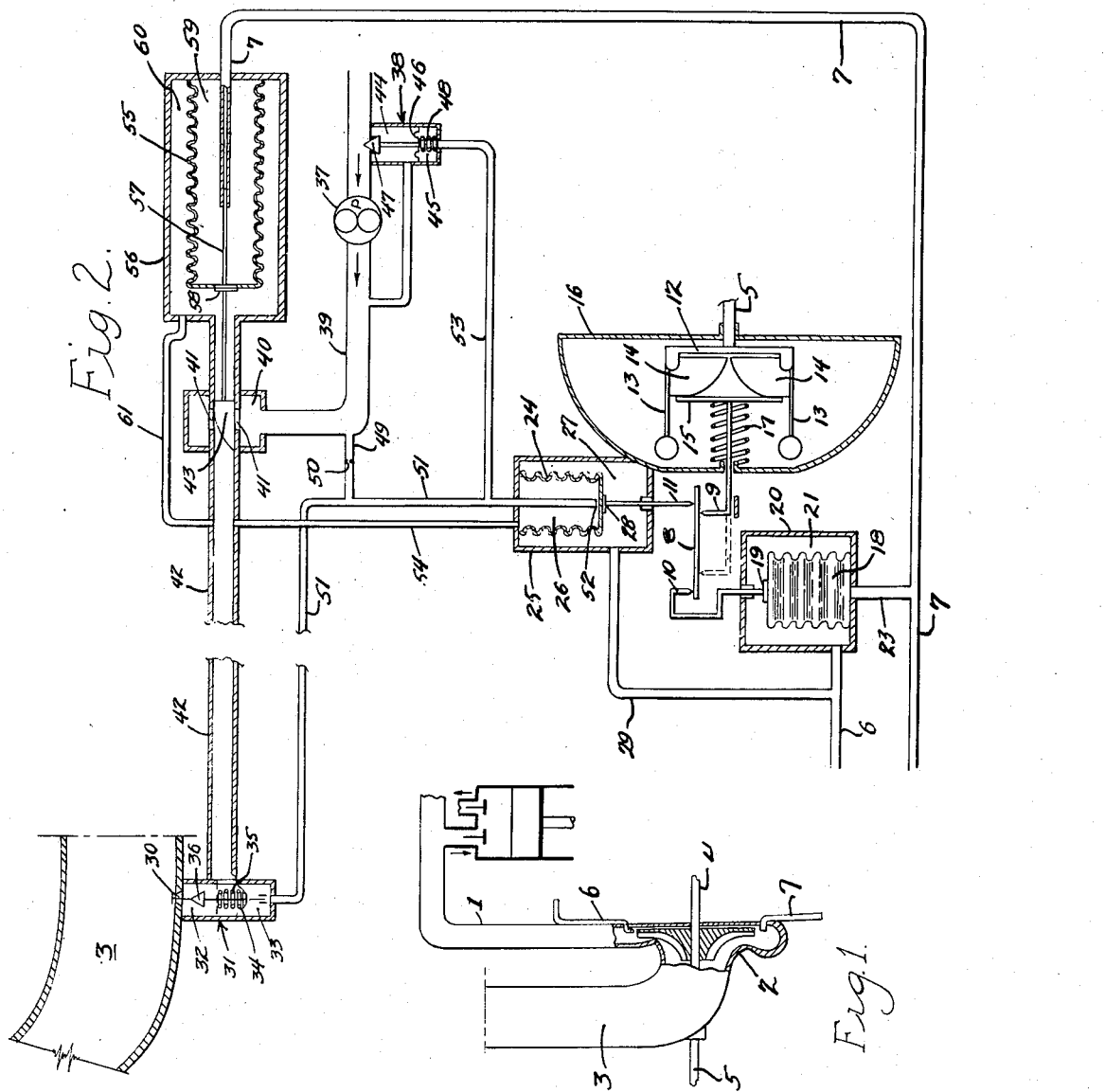

2,441,948

UNITED STATES PATENT OFFICE 2,441,948

FUEL METERING APPARATUS FOR SUPER-CHARGED INTERNAL-COMBUSTION ENGINES

Allen S. Atkinson, Haddonfield, N. J.

Application April 20, 1945, Serial No. 589,448

7 Claims. (Cl. 123—119)

(Granted under the act of March 3, 1883, as amended April 30, 1928; 370 O. G. 757)

This invention relates to new and useful improvements in supercharged internal combustion engine carburetion, and more particularly to apparatus for controlling the amount of fuel supplied to the engine in a desired relation to the ratio of the difference between a predetermined total pressure and the static pressure in the supercharger impeller discharge region to the speed of rotation of the supercharger impeller.

As set forth in the copending application of Daniel G. Russ, Serial No. 589,439, filed April 20, 1945, it has been determined that the mass flow of air supplied to a supercharged internal combustion engine is proportional to the ratio of the difference between a predetermined total pressure and the static pressure in the supercharger impeller discharge region to the speed of rotation of the supercharger impeller, and that these values can be measured and translated to meter the fuel fed to the engine substantially in conformity to the optimum fuel flow desired over the entire operating range of the engine, as well as providing numerous other advantages and benefits that are not obtainable with conventional carburetors and carburetion systems.

With the foregoing in mind, the principal object of the present invention is to provide novel apparatus that is operable to control the fuel flow to a supercharged internal combustion engine in a desired relation to the ratio of the difference between a predetermined total and the static pressures in the supercharger impeller discharge region to the speed of rotation of the supercharger impeller.

Another object of the invention is to provide novel apparatus of the type described that permits engine operation at increased fuel pressures and which requires no compensatory adjustments for changes in the pressure and temperature of the intake air.

Another object of the invention is to provide novel apparatus of the stated character that is substantially insensitive to changes in air scoop design and which is characterized by a minimum pressure loss in the air induction system thus increasing the critical altitude ceiling for efficient engine operation.

Still a further object of the invention is to provide novel apparatus having the characteristics described that is of the fluid pressure operated type, substantially fool-proof and automatic in operation, and which is characterized by the advantage that it may be used interchangeably with different sizes of engines merely upon changing the metering orifice and nozzle in the fuel channel as may be required.

These and other objects of the invention and the various features and details of the construction and operation thereof, are hereinafter more fully set forth and described with reference to the accompanying drawing in which:

Fig. 1 is a fragmentary view in elevation of the intake, supercharger and manifold of a supercharged internal combustion engine; and Fig. 2 is a diagrammatic illustration of suitable apparatus embodying the present invention and operable to meter fuel flow in accordance herewith.

Referring to the drawing, and more particularly to Fig. 1 thereof, reference numeral 1 designates the intake manifold of an internal combustion engine, the inlet to which is connected to the discharge of a conventional main engine supercharger 2 that has its intake connected to an air-fuel intake duct 3. The supercharger 2 comprises the usual rotary impeller that is driven by a shaft 4 from a suitable power source, and connected to and driven by the impeller at the speed of rotation thereof or at a speed directly proportional thereto and extending outwardly through a journal in the duct 3, is a shaft 5 from which suitable speed responsive control mechanism of the apparatus of the present invention may be driven at the speed of rotation of the supercharger impeller. In addition to providing a supercharger impeller speed take-off, such as the shaft 5, the supercharger 2 is provided with take-off taps or tubes 6 and 7, respectively, for the predetermined total and static pressures existing in the supercharger impeller discharge region. The pressure taps may be constructed and arranged in the supercharger, for example, as shown and described in the aforesaid copending application of Daniel G. Russ.

As previously stated herein, the present invention has for its objectives the provision of novel apparatus that is operable to meter fuel flow to the engine in accordance with the ratio of the difference between the supercharger predetermined total and static pressures in the impeller discharge region to the speed of rotation of the supercharger impeller, and in Fig. 2 of the drawing there is diagrammatically illustrated one form of apparatus embodying the present invention that is operable effectively to meter fuel flow in the manner set forth herein.

Referring to Fig. 2 there is illustrated diagrammatically a control apparatus of the fluid-pressure operated type comprising essentially a control bar 8 suitably supported by three fulcrum elements 9, 10 and 11, respectively, that are actuable relative to one another and the bar, as hereinafter described, in response to variations in the supercharger speed, and in the differential between the impeller discharge total and static pressures, to control the discharge or injection of fuel into the intake duct 3 leading to the supercharger 2 of the internal combustion engine.

The fulcrum element 9 supports the control bar 8 at one side thereof from the fulcrum elements 10 and 11, and is adapted to be positioned or moved lengthwise of the bar 8 in response to variations in the speed of rotation of the supercharger impeller. This may be accomplished, for example, by means of a speed responsive mechanism comprising a cross-piece 12 that is rotationally driven at the supercharger impeller speed by the shaft 5, the said cross piece 12 having pivoted thereto weighted arms 13 movable outwardly in proportion to the speed of rotation at which the cross-piece 12 is driven. The arms carry cam elements 14 movable therewith to effect linear actuation of the fulcrum 9 lengthwise of the bar 8 through a cross-head member 15. The speed responsive mechanism may be mounted in a suitable housing structure 16, and a spring 17 preferably is provided and arranged to urge the fulcrum 9 to the zero speed limit of its linear traverse and to oppose actuation thereof by said cam elements 14. This speed responsive mechanism is constructed and arranged so that any instantaneous position of the fulcrum 9 relative to the control bar 8 is directly proportional to the speed of rotation of the supercharger impeller. The position of fulcrum 9 as shown by the full lines represents the zero position, that is, the position thereof when the impeller is not rotating. The position as shown by the dotted lines represents one of the positions assumed when the impeller is rotating, this particular position being corresponding to approximately the maximum speed of rotation of the impeller. When the impeller speed is between the two limits above described, the fulcrum 9 will assume intermediate position between the full line and dotted line positions.

The fulcrum element 10, on the other hand, remains in a fixed position longitudinally with respect to the control bar 8, but is movable in a direction perpendicular or normal to the linear path of movement of the fulcrum 9 in response to variations in the supercharger impeller discharge total and static pressures hereinbefore described. Actuation of the fulcrum 10 by this means may be accomplished, for example, by an expansible-contractible bellows device 18 having said fulcrum 10 secured to and movable with the free end wall thereof as indicated at 19. The bellows 18 is mounted within a fluid-tight casing 20 that defines externally of the bellows a chamber 21 and the bellows has its fixed end wall portion secured in fluid-tight relation with respect to the casing 20 to provide a fluid-tight chamber internally of the bellows 18.

As previously stated, the fulcrum 10 is actuated by axial expansion and contraction of the bellows 18 in response to variations in the impeller discharge total and static pressures and, as shown in Fig. 2, the tube or pipe 6 transmitting the supercharger total pressure is connected to the chamber 21 surrounding the bellows 18, and the pressure chamber within the bellows 18 is subjected to the supercharger static pressure through a branch pipe 23 that leads into the bellows 18 from the supercharger static pressure tube 7.

The fulcrum element 11 likewise is movable in a direction perpendicular to the path of movement of the fulcrum 9, but in response to variations in the pressure at which the fuel is discharged into the intake duct 3 (the fuel pump vent pressure being negligible), and the supercharger total pressure on the other part. Actuation of the fulcrum 11 similarly may be accomplished by means of an expansible-contractible bellows device 24 mounted within a casing structure 25 so as to provide fluid-tight chambers 26 and 27, respectively, internally and externally of the bellows 24, the fulcrum 11 being connected to the free end wall of said bellows as indicated at 28 for movement therewith upon axial expansion and contraction of the bellows. The chamber 27 within the casing 25 and exteriorly of the bellows 24 is connected to the impeller discharge total pressure line 6 by means of a pipe or tube 29.

Fuel is injected into the engine intake duct 3 through an orifice or nozzle 30 controlled by a pressure valve mechanism designated generally as 31, and comprising pressure chambers 32 and 33, respectively, separated by a flexible diaphragm 34 that is biased by a spring 35 acting thereon in the direction of the chamber 33, the diaphragm serving to actuate the valve element 36 relative to the nozzle 30 and the spring acting to urge the valve toward its open position. Fuel is supplied under pressure to the chamber 32 of valve 31 for injection into the duct 3 from a fuel supply tank (not shown) by means of a conventional gear-type pump 37 having associated therewith in the usual manner a relief valve 38, fuel being discharged from said pump 37 through a fuel pipe 39 to an annular manifold arrangement 40 from which the fuel passes through an orifice 41 and enters a pipe 42 that leads to the valve chamber 32 and the nozzle or orifice 30, admission of the fuel from the manifold 40 to pipe 42 being controlled by a valve 43. The relief valve 38 is constructed similar to the nozzle valve 31 and comprises two chambers 44 and 45 separated by a flexible diaphragm 46 that actuates the valve element 47, the diaphragm 46 in this case, however, being biased by a spring 48 in the direction of the chamber 44 thus tending to urge the valve toward its closed position.

Connected to the fuel pump discharge pipe 39 is a branch pipe connection 49 of smaller diameter into which fuel at the pump discharge pressure flows, and this branch 49 is provided with a fixed bleed or restrictor 50 therein that operates to reduce the pressure of fuel passing therethrough to fuel pump vent pressure. The pipe 49 is connected to a pipe 51 that has one end thereof connected to the chamber 33 in the valve 31 and has its other end extending through the casing 25 and axially into the chamber 26 within the bellows 24, the said pipe terminating inwardly of said bellows adjacent the movable free end wall thereof which carries the fulcrum 11 as indicated so that movement of the end wall relative to the end of said pipe 51 in response to expansion and contraction of the bellows 24 increases and decreases the orifice opening 52 from the pipe 51 to the chamber 26. The pipe 51 is connected also by means of a pipe 53 to the chamber 45 of the relief valve 38. In addition communication is provided between the chamber 26 within the bellows 24 and the fuel pipe 42 by means of a pipe 54 that is connected to the bellows chamber 26 at the stationary or fixed end thereof.

The valve 43 regulating admission of fuel into the pipe 42 is controlled also by means of an expansible-contractible bellows 55 movable in response to changes in the fuel nozzle discharge pressure and the static supercharger pressure previously described. The bellows 55 has one end mounted in fluid-tight relation within a casing structure 56, and the stem 57 of the valve 43 is connected to the free end wall of the bellows 55 as indicated at 58 for actuation thereby upon expansion and contraction of the bellows. The chamber 59 within the bellows 55 is subjected to the impeller discharge static pressure through the pipe 7 which extends through the casing 56 into the chamber 59 substantially coaxially of the bellows 55, and the chamber 60 within the casing 56 exteriorly of the bellows 55 is subjected to the fuel discharge nozzle pressure through a pipe 61 that is connected between the pipe 42 and the interior of the casing 56. As shown, the valve stem 57 may extend into the bellows 55 and have its end portion slidably disposed within the end portion of the pipe 7 so that the latter may act as a guide or support for said stem 57.

As previously stated, the construction and arrangement of the speed responsive mechanism that actuates the fulcrum 9 is such that movement thereof longitudinally of the control bar 8 is directly proportional to the speed of rotation of the supercharger 2. Furthermore, the spring constant of the bellows 55 is the sole force resisting movement of the valve 43 and, since in operation of the apparatus the differential between the fuel pump discharge pressure and the discharge pressure through nozzle 30 is maintained substantially constant, the flow of fuel through the orifice 41 is directly proportional to the area thereof, the valve 43 being contoured so that the flow area through orifice 42 is the same function of the distance that valve 43 travels to the right when the air flow through the supercharger is zero, as the desired fuel flow is of air flow. In addition to the differential between the fluid pump and nozzle discharge pressures being maintained substantially constant, the construction and operation of the control bar 8 is such that it tends to remain in its original position.

In operation, a small amount of fuel at pump discharge pressure that is discharged by the pump 37 into pipe 39 flows through the restrictor 50 in pipe 49 whereby its pressure is reduced to pump vent pressure. This fuel then flows through pipe 51 to the interior of the bellows 24 through orifice 52 which is variable by reason of the movement of the adjacent end wall of the bellows in response to expansion and contraction thereof. From the bellows 24, the fuel admitted thereto by pipe 51 flows through the pipe 54 to the fuel line 42 whence it is discharged into the intake duct 3 through nozzle 30. Fuel entering the bellows 24 from pipe 51 undergoes a further pressure drop at orifice 52 so that the pump vent pressure of the fuel is greater than the discharge pressure at nozzle 30. The spring 35 in valve 31 exerts a force in the direction of the low pressure side of the diaphragm 41 sufficient to balance the valve 31 when operating at stable conditions with the result that the valve 31 operates to maintain the pump vent fuel pressure at a constant value greater than the nozzle discharge pressure while the pump relief valve 38 maintains the fuel pump discharge pressure at a constant value greater than the fuel pump vent pressure. The differential between the pump discharge and nozzle discharge pressures therefore tends to remain constant.

Continuing, any movement of the bar 8, resulting from changes in the positions of the fulcrums 9 and 10 in response to variations in the speed of the supercharger impeller or the difference between the supercharger stagnation and static pressures, that causes fulcrum 11 to move upwardly, will effect a decrease in the area of the orifice 52 thereby causing the pump vent pressure to increase and partially closing the fuel pump relief valve 38 with resulting increase in the pump discharge pressure. This increase in the pump vent pressure causes diaphragm 34 to partially close the valve element 36 with nozzle 30 thereby increasing the nozzle discharge pressure until it is sufficient to cause expansion of the bellows 24 a distance sufficient to return the orifice 52 to its original area and at the same time causing fulcrum 11 to return to its original position. A downward movement of the fulcrum 11 with accompanying movement of the bar 8 produces an action that is the reverse of that just described resulting in the control bar 15 being returned to its original normal position automatically.

It is to be noted that operation of the apparatus in accordance with the present invention is dependent upon the effective areas of the bellows 18 and 24, which control respectively the fulcrums 10 and 11, be equal to one another, and with respect to the forces acting on the control bar 8 it will be clear that for a given distance D between the fulcrums 10 and 11 the forces acting upon the bar 8, with the fulcrum 9 positioned a distance $d$ inwardly along the bar 8 from the fulcrum 11, may be expressed as follows:

I $$F_{10}(D-d) = F_{11}d$$

or

II $$F_{10} + F_{11} = \frac{F_{10}D}{d}$$

Continuing, the force exerted by the fulcrum 10 ($F_{10}$) on the bar 8 by the bellows 18 is the differential between the impeller discharge total and static pressures ($P_t - P_s$) multiplied by the effective area ($A_{18}$) of the said bellows 18, or:

III $$(P_t - P_s)(A_{18}) = F_{10}$$

and the force exerted on bar 8 by the fulcrum 11 actuated by bellows 24 is the differential between the discharge pressure at nozzle 30 ($P_n$) and the supercharger tangential total pressure ($P_t$) multiplied by the effective area ($A_{24}$) of said bellows 24, or:

IV $$(P_n - P_t)(A_{24}) = F_{11}$$

By combining Equations III and IV, the combined forces of fulcrums $F_{10}$ and $F_{11}$ acting on bar 8 may be expressed as:

V $$P_t(A_{18}) - P_s(A_{18}) + P_n(A_{24}) - P_t(A_{24}) = F_{10} + F_{11}$$

but since the effective areas of the bellows 18 and 24 are equal and constant the factors $P_t(A_{18})$ and $-P_t(A_{24})$ cancel out to give:

VI $$P_n(A_{24}) - P_s(A_{18}) = F_{10} + F_{11}$$

On the other hand, the distance ($d$) that the fulcrum 9 is located inwardly along the bar 8 from the fulcrum 11 is a function of the speed of rotation (N) of the supercharger so that:

VII $$d = KN$$

where K is a constant, and substituting for ($F_{10}$) and ($d$) in Equation II the values therefor given given by Equations III and VI gives:

VIII $$F_{10} + F_{11} = \frac{(P_t - P_s)(A_{18})D}{KN} = C\frac{P_t - P_s}{N}$$

where C is any constant but, as previously stated herein, it has been determined that the weight of air (W) in pounds per hour supplied to a supercharged engine is proportional to the ratio of the dynamic pressure differential ($P_t - P_s$) in the supercharger impeller discharge region to the speed of rotation (N) of the impeller so that:

IX $\qquad F_{10}+F_{11}=CW$

However, if Equations VI and IX are combined the weight of air (W) supplied may be expressed as:

X $\qquad P_n(A_{24})-P_s(A_{18})=CW$ but since the effective areas ($A_{18}$) and ($A_{24}$) of the bellows 18 and 24 are equal to each other and constant these values may be disregarded and hence:

XI $\qquad P_n-P_s=CW$

The amount of fuel supplied to the engine is regulated by the valve 43 which is operated by the bellows 55 according to the differential between the nozzle discharge pressure ($P_n$) to which the exterior of bellows 55 is subjected by pipe 61 and the supercharger tangential static pressure ($P_s$) to which the interior of said bellows is subjected by the pipe 7 as given in Equation XI. But from equations VIII and IX it is apparent that:

$$CW=\frac{P_t-P_s}{N}$$

and substituting in Equation XI gives:

XII $\qquad P_n-P_s=C\dfrac{(P_t-P_s)}{N}$ which establishes that the present apparatus operates as described to effectively meter fuel flow to the engine in accordance with the ratio of the difference between the dynamic pressure differential in the supercharger impeller discharge region to the speed of rotation of the supercharger impeller.

Since the method and apparatus of the present invention utilize the differential between a predetermined total and the static pressures in the impeller discharge region of the supercharger as one factor of the ratio in proportion to which fuel flow is metered, changes in the intake air temperature and pressure become immaterial, and the adjustments to compensate for changes in the pressure and temperature of the air, such as are required in the case of conventional type carburetors, are entirely eliminated.

Too, since the pressure differential employed is that existing between the tangential total and static pressures in the supercharger discharge region wherein exist the highest pressures in the entire air-fuel supply system, the carburetion system of the present invention will operate efficiently at higher pressures than conventional type carburetors with the result that percentage errors in the accuracy of the system due to friction losses are substantially minimized.

Furthermore, since the pressure taps 10 and 11 are located at the supercharger impeller discharge region, any obstruction or stratification of the intake air will have been dissipated or eliminated after passage of the air through the supercharger 2 with negligible resulting effect upon the total and static pressures transmitted by the tubes 10 and 11 to the associated control apparatus. Accordingly the present system is much less sensitive to changes in air scoop design than are conventional type carburetion systems wherein the carburetor generally is positioned immediately downstream of the intake scoop convolutions and fuel induction is controlled by the pressure differential across the venturi, with the result that any change in air scoop design effecting a variation, the obstruction, or stratification characteristics of the intake air, will affect the operation of the carburetor.

In addition, the present system is characterized by a substantially lower pressure loss in the air induction system than are systems employing conventional type carburetors. This is so for the reason that the venturi of conventional carburetors produces a pressure loss in the intake air whereas no venturi or other pressure dissipator is present in the system of this invention, and this characteristic of minimum pressure loss in the air induction of the present system also effectively lessens any tendency for the air to ice, and permits efficient operation of the engine at greater altitudes.

From the foregoing it will be observed that the present invention provides a novel method and apparatus for metering fuel flow in accordance with the ratio of the differential between the dynamic pressure differential in the supercharger impeller discharge region to the speed of rotation of the supercharger impeller, that eliminates the necessity for a conventional type carburetor with its attendant limitations and objectionable characteristics. The invention provides also a fuel carburetion system for supercharged internal combustion aircraft engines wherein the working forces of the system vary as a straight line with air flow. The invention is further characterized by its simplicity and lightness in weight, its entirely automatic operation, its fool-proof nature and efficient operation.

While certain particular embodiments of the present invention have been illustrated and described herein, it is not intended that the invention be limited to this disclosure, and it is contemplated that changes and modifications therein and thereto may be made within the scope of the claims.

The invention described herein may be manufactured and used by or for the Government of the United States of America for governmental purposes without the payment of any royalties thereon or therefor.

I claim:

1. In apparatus for metering the flow of fuel to an internal combustion engine having associated therewith a supercharger provided with a rotationally driven impeller; means to tap-off from the impeller discharge region of the supercharger a predetermined total pressure and the static pressure; speed responsive means arranged to be driven directly proportional to the speed of rotation of the impeller; means to discharge fuel under pressure to said engine; and mechanisms cooperatively associated and tending to maintain a mechanical balance between forces generated by said speed responsive means, the differential between the said impeller discharge total and static pressures and the differential between the fuel discharge and said impeller discharge total pressures.

2. In apparatus for metering the flow of fuel to an internal combustion engine having associated therewith a supercharger provided with a rotationally driven impeller; means to tap-off from the impeller discharge region of the supercharger a predetermined total pressure and the static pressure; speed responsive means arranged to be driven directly proportional to the speed of rotation of the impeller; means to discharge fuel under pressure to said engine; and mechanisms cooperatively associated and tending to maintain a mechanical balance between forces generated by said speed responsive means, the differential between the said impeller discharge total and static pressures and the differential between the fuel discharge and said impeller discharge total pressures; a valve to control fuel flow for discharge to said engine; and means to operate said valve and control fuel flow to the engine according to changes in the differential between said fuel discharge and impeller static pressures.

3. In apparatus for metering the flow of fuel to an internal combustion engine having associated therewith a supercharger provided with a rotationally driven impeller, means to tap-off from the impeller discharge region of the supercharger a predetermined total pressure and the static pressure, speed responsive means associated with said supercharger and arranged to be driven directly proportional to the speed of rotation of the impeller, a control member, first, second and third control elements cooperable with said control member, means to actuate the first control element relative to the control member in accordance with the speed of rotation of the supercharger impeller, means to actuate said second control element according to changes in the differential between said impeller discharge total and static pressures, a valve controlling fuel flow for discharge to the engine, means to actuate said third control element cooperatively with respect to said control member according to changes in the differential between the fuel discharge pressure and the supercharger impeller static pressure, and means to actuate said valve in accordance with changes in the differential between said fuel discharge pressure and the supercharger impeller static pressure.

4. In apparatus for metering the flow of fuel to an internal combustion engine having associated therewith a supercharger provided with a rotationally driven impeller, means to tap-off from the impeller discharge region of the supercharger a predetermined total pressure and the static pressure, speed take-off means associated with said supercharger and arranged to be driven at the speed of rotation of the impeller, a control member, first, second and third control elements cooperable with said control member, means to actuate the first control element relative to the control member in accordance with the speed of rotation of the supercharger impeller, means to actuate said second control element according to changes in the differential between said impeller discharge total and static pressures, a discharge valve to control fuel flow to the engine, pump means to supply fuel under pressure to said discharge valve, a second valve controlling fuel flow from said pump to said discharge valve, means to actuate said third control element cooperatively with respect to said control member in accordance with changes in the differential between the fuel discharge pressure and the supercharger impeller total pressure, and means to actuate said second valve in accordance with changes in the differential between said fuel discharge pressure and the supercharger impeller static pressure.

5. In apparatus for metering the flow of fuel to an internal combustion engine having associated therewith a supercharger provided with a rotationally driven impeller, means to tap-off from the impeller discharge region of the supercharger a predetermined total pressure and the static pressure, speed take-off means associated with said engine arranged to be driven directly proportional to the speed of rotation of the impeller, a control member, first, second and third control elements cooperable with said control member, means actuated by said speed take-off means operable to actuate the first control element relative to the control member in accordance with the speed of rotation of the supercharger impeller, means operable in response to changes in the differential between said supercharger total and static pressures to actuate said second control element according to said changes in said pressure differential, a valve controlling fuel flow for discharge into said engine, means operable in response to changes in the differential between the fuel discharge pressure and the supercharger total pressure operable to actuate said third control element cooperatively with respect to said control member and tending to balance with the first and second control means acting thereon, and means operable in response to changes in the differential between said fuel discharge pressure and the supercharger impeller static pressure to actuate said fuel flow control valve.

6. In apparatus for metering the flow of fuel to an internal combustion engine having associated therewith a supercharger provided with a rotationally driven impeller, means to tap-off from the impeller discharge region of the supercharger a predetermined total pressure and the static pressure, speed take-off means associated with said supercharger and arranged to be driven at the speed of rotation of the impeller, a control member, first, second and third control elements cooperable with said control member, means actuated by said speed take-off means operable to actuate the first control element relative to the control member in accordance with the speed of rotation of the supercharger impeller, means operable in response to changes in the differential between said supercharger total and static pressures to actuate said second control element according to said changes in said pressure differential, a discharge valve to control fuel flow to the engine, pump means to supply fuel under pressure to said discharge valve, a second valve controlling fuel flow from said pump to said discharge valve, means operable in response to changes in the differential between the discharge valve fuel pressure and the supercharger total pressure operable to actuate said third control element cooperatively with respect to said control member and tending to balance with the first and second control elements acting thereon, and means operable in response to changes in the differential between said discharge valve pressure and the supercharger impeller discharge static pressure to actuate said second valve to control fuel flow from said pump to said discharge valve.

7. In apparatus for metering the flow of fuel to an internal combustion engine having associated therewith a supercharger provided with a rotationally driven impeller, means to tap-off from the impeller discharge region of the supercharger a predetermined total pressure and the static pressure, speed take-off means associated with said supercharger and arranged to be driven at the speed of rotation of the impeller, a control member, first, second and third control elements cooperable with said control member, means actuated by said speed take-off means operable to actuate the first control element relative to the control member in accordance with the speed of rotation of the supercharger impeller, expansible-contractible means operable in response to changes in the differential between said supercharger total and static pressures to actuate said second control element according to changes in said pressure differential, a discharge valve to control fuel flow to the engine, pump means to supply fuel under pressure to said discharge valve, a second valve controlling fuel flow from said pump to said discharge valve, expansible-contractible means operable in response to changes in the differential between the discharge valve pressure and the supercharger total pressure operable to actuate said third control element cooperatively with respect to said control member and tending to balance with the first and second control elements acting thereon, and expansible-contractible means operable in response to changes in the differential between said discharge valve pressure and the supercharger impeller discharge static pressure to actuate said second valve to control fuel flow from said pump to said discharge valve.

ALLEN S. ATKINSON.

REFERENCES CITED

The following references are of record in the file of this patent:

UNITED STATES PATENTS

| Number | Name | Date |
|---|---|---|
| 2,324,599 | Schorn | July 20, 1943 |
| 2,330,650 | Weiche | Sept. 28, 1943 |
| 2,369,665 | Gosslau | Feb. 20, 1945 |
| 2,372,456 | Chandler | Mar. 27, 1945 |
| 2,374,130 | Planiol | Apr. 17, 1945 |
| 2,378,036 | Reggio | June 12, 1945 |

FOREIGN PATENTS

| Number | Country | Date |
|---|---|---|
| 523,895 | Great Britain | July 25, 1940 |